(12) United States Patent
Blottiau et al.

(10) Patent No.: US 11,299,022 B2
(45) Date of Patent: Apr. 12, 2022

(54) KIT AND METHOD FOR CLADDING A DOOR RAIL OF A VEHICLE

(71) Applicant: HUTCHINSON, Paris (FR)

(72) Inventors: Olivier Blottiau, Cepoy (FR); Cyril Lajoux, Vimory (FR); Anne Gambier, Paris (FR)

(73) Assignee: HUTCHINSON, Paris (FR)

( * ) Notice: Subject to any disclaimer, the term of this patent is extended or adjusted under 35 U.S.C. 154(b) by 168 days.

(21) Appl. No.: 16/707,911

(22) Filed: Dec. 9, 2019

(65) Prior Publication Data

US 2020/0180416 A1 Jun. 11, 2020

(30) Foreign Application Priority Data

Dec. 10, 2018 (FR) ........................................ 1872635

(51) Int. Cl.
| | | |
|---|---|---|
| *E05D 15/16* | (2006.01) | |
| *B60J 10/76* | (2016.01) | |
| *B60J 10/79* | (2016.01) | |
| *B60J 1/17* | (2006.01) | |

(52) U.S. Cl.
CPC ................. *B60J 10/76* (2016.02); *B60J 1/17* (2013.01); *B60J 10/79* (2016.02)

(58) Field of Classification Search
CPC . B60J 10/76; B60J 10/79; B60J 10/365; B60J 10/86; B60J 1/17
USPC ........................................................ 49/441
See application file for complete search history.

(56) References Cited

U.S. PATENT DOCUMENTS

| | | | | |
|---|---|---|---|---|
| 5,385,703 A | * | 1/1995 | Shanok | B29C 48/12 264/145 |
| 10,195,928 B2 | * | 2/2019 | Liu | B60J 10/78 |
| 11,046,163 B2 | * | 6/2021 | Gonnet | B60J 10/70 |
| 11,059,360 B2 | * | 7/2021 | Guellec | B60J 1/17 |
| 2008/0110101 A1 | * | 5/2008 | Gross | B60R 13/06 49/489.1 |
| 2008/0116713 A1 | * | 5/2008 | Jun | B60J 10/74 296/146.2 |
| 2010/0237644 A1 | * | 9/2010 | Senge | B60J 10/30 296/1.08 |
| 2010/0327621 A1 | * | 12/2010 | Gerndorf | B60J 10/76 296/146.7 |
| 2011/0296763 A1 | * | 12/2011 | Lee | B60J 10/76 49/493.1 |

(Continued)

FOREIGN PATENT DOCUMENTS

| | | |
|---|---|---|
| DE | 102004035380 A1 | 2/2006 |
| DE | 102015004982 A1 | 10/2016 |

(Continued)

OTHER PUBLICATIONS

Rapport de Recherche Préliminaire dated Aug. 7, 2019, issued in priority French Application No. 1872635, filed Dec. 10, 2018, 2 pages.

*Primary Examiner* — Jerry E Redman

(74) *Attorney, Agent, or Firm* — Christensen O'Connor Johnson Kindness PLLC

(57) ABSTRACT

A kit for cladding a door rail of a vehicle, comprising two similar assemblies suitable for mounting on the rail of the same door, only one of these assemblies being mounted on this rail according to a desired aesthetic aspect among a first aspect called flush and a second aspect called non flush.

10 Claims, 8 Drawing Sheets

(56) References Cited

U.S. PATENT DOCUMENTS

| | | | | |
|---|---|---|---|---|
| 2012/0144751 A1* | 6/2012 | Schapitz | B60J 10/265 | 49/431 |
| 2012/0153659 A1* | 6/2012 | Senge | B60J 10/70 | 296/93 |
| 2012/0228448 A1* | 9/2012 | Jabra | B60J 10/235 | 248/221.11 |
| 2012/0247026 A1* | 10/2012 | Sato | B60R 13/04 | 49/493.1 |
| 2013/0186018 A1* | 7/2013 | Grandgirard | B60J 1/10 | 52/204.72 |
| 2014/0292012 A1* | 10/2014 | Yoshida | B60R 13/04 | 296/1.08 |
| 2016/0059684 A1* | 3/2016 | Nam | B60J 10/08 | 49/483.1 |
| 2017/0001504 A1* | 1/2017 | Takeda | B60J 10/76 | |
| 2017/0113528 A1* | 4/2017 | Kawase | B60J 10/40 | |
| 2017/0129318 A1* | 5/2017 | Uemura | B60J 5/0402 | |
| 2018/0272413 A1* | 9/2018 | Yanai | B60J 10/265 | |
| 2018/0312045 A1* | 11/2018 | Charge | B60J 5/0408 | |
| 2018/0339576 A1* | 11/2018 | Heppner | B60J 5/0463 | |
| 2019/0077230 A1* | 3/2019 | Tallent | B60J 10/79 | |
| 2019/0193542 A1* | 6/2019 | Prodoni | B60J 10/265 | |
| 2019/0381875 A1* | 12/2019 | Schmitz | B60J 10/78 | |
| 2020/0130488 A1* | 4/2020 | Choi | B60J 10/76 | |
| 2020/0180405 A1* | 6/2020 | Blottiau | B60J 10/79 | |
| 2020/0247220 A1* | 8/2020 | Lorentsson | E05F 11/52 | |
| 2020/0338974 A1* | 10/2020 | Lee | B60J 10/86 | |
| 2020/0362611 A1* | 11/2020 | Ishiguro | E05F 11/423 | |
| 2020/0369137 A1* | 11/2020 | Tawada | B60J 10/86 | |
| 2021/0039484 A1* | 2/2021 | Jeon | B60J 5/0402 | |
| 2021/0206239 A1* | 7/2021 | Ishiguro | B60J 1/17 | |

FOREIGN PATENT DOCUMENTS

| | | | | |
|---|---|---|---|---|
| GB | 2215284 A | * | 9/1989 | ............ B60J 10/82 |
| GB | 2515525 A | | 12/2014 | |
| GB | 2537993 A | | 11/2016 | |
| GB | 2557664 A | | 6/2018 | |

* cited by examiner

[Fig. 1]
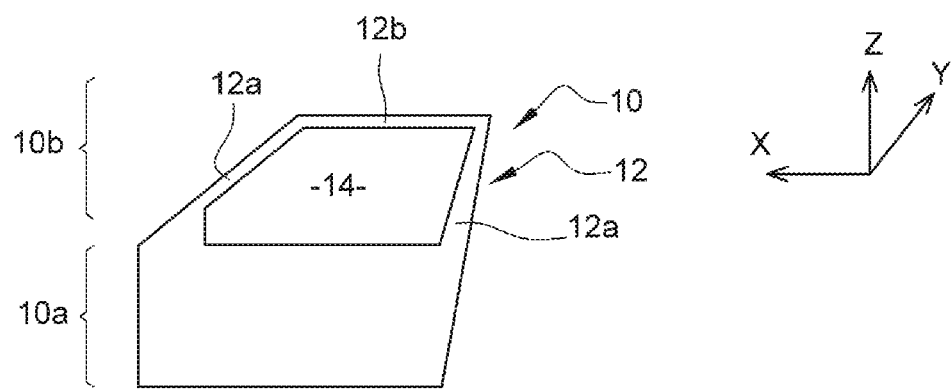
[Fig. 2]
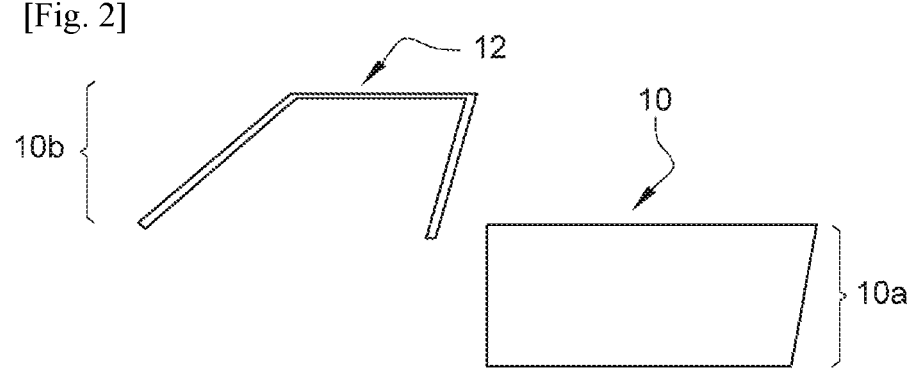
[Fig. 3]
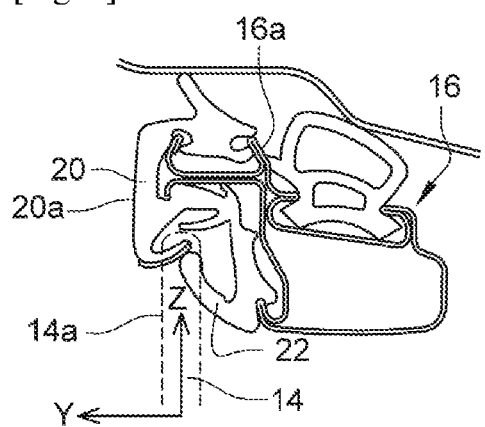

[Fig. 4]
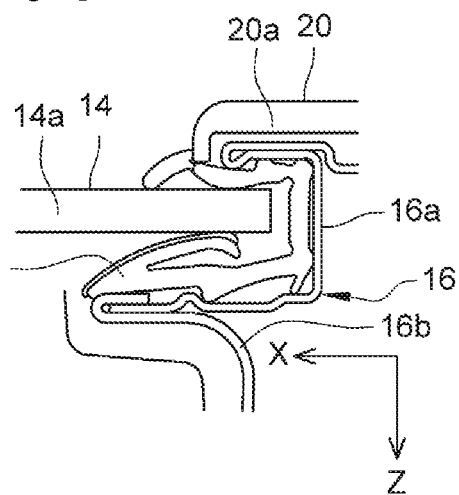
[Fig. 5]
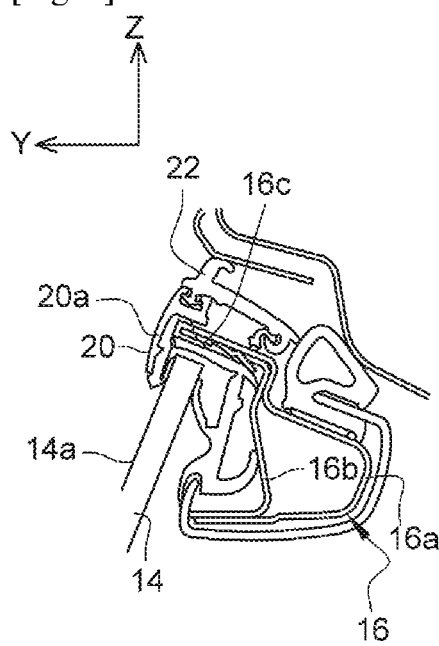

[Fig. 6]
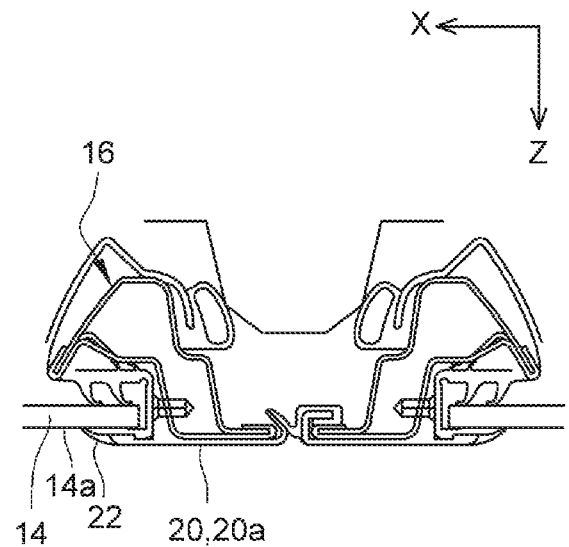
[Fig. 7]
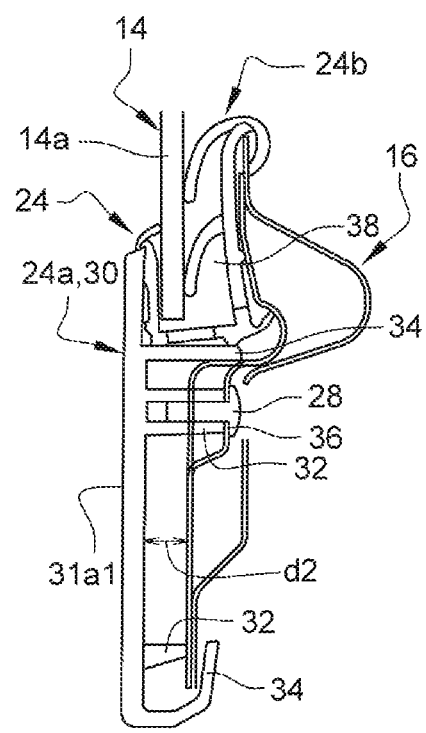

[Fig. 8]
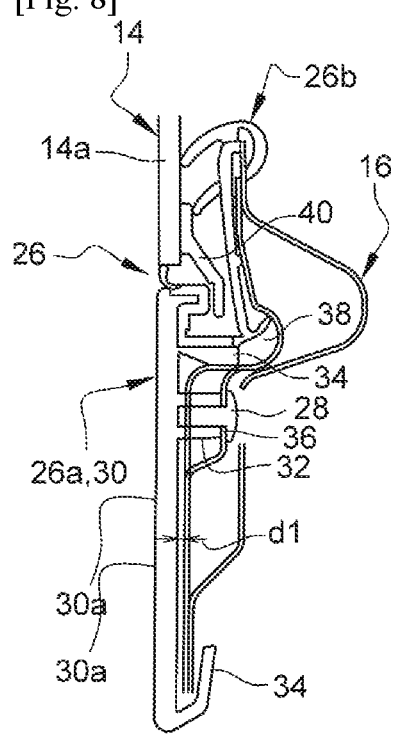
[Fig. 9]
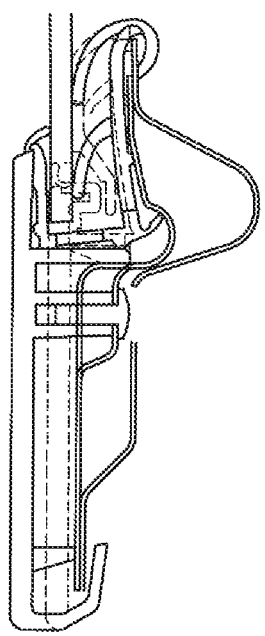

[Fig. 10]
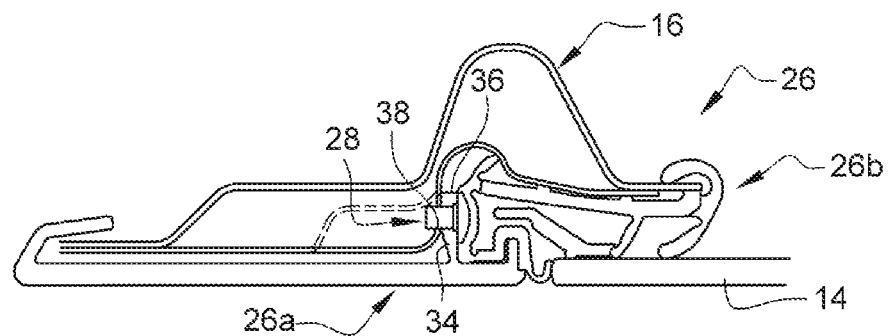
[Fig. 11]
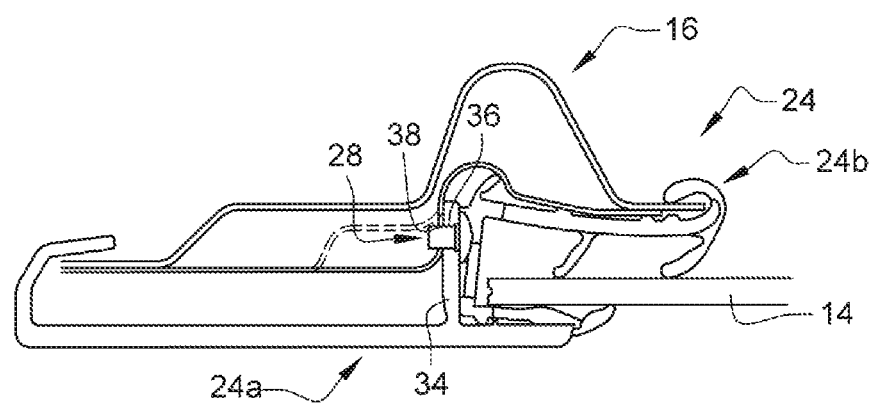
[Fig. 12]
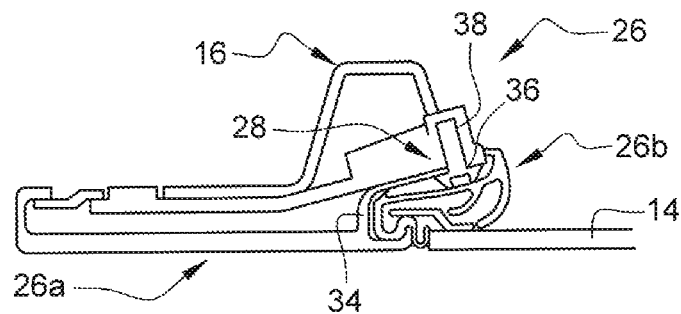

[Fig. 13]
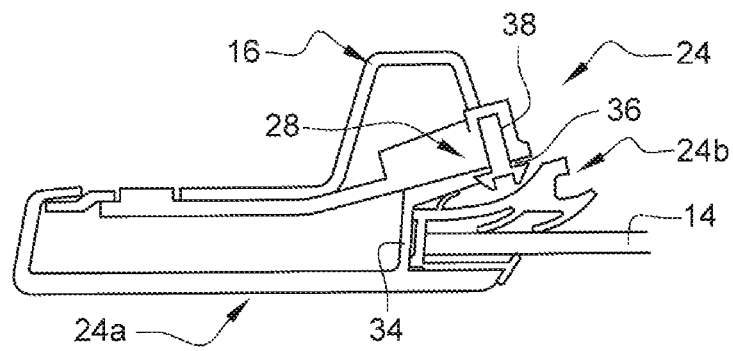
[Fig. 14]
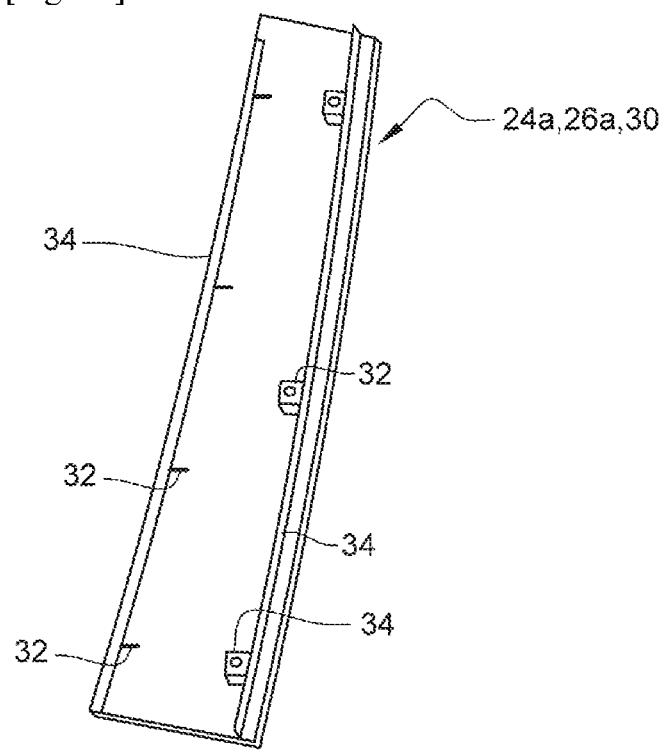

[Fig. 14a]
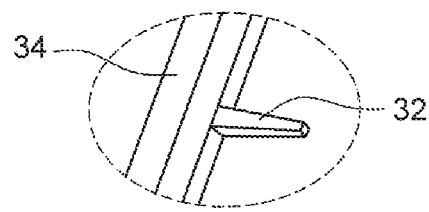
[Fig. 15]
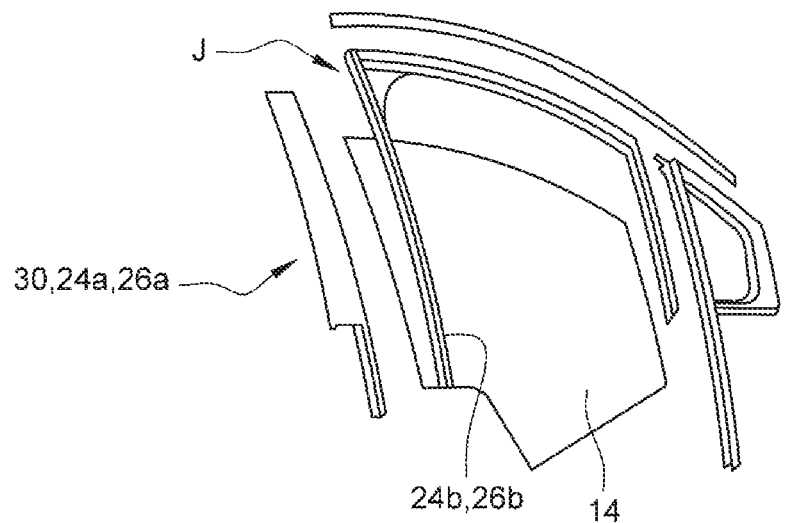

[Fig. 16]
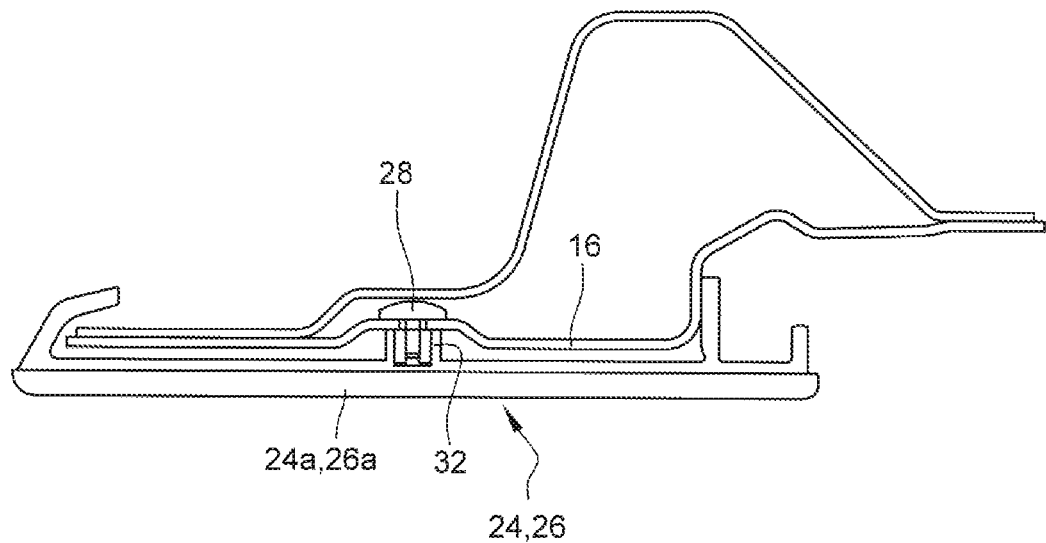
[Fig. 17]
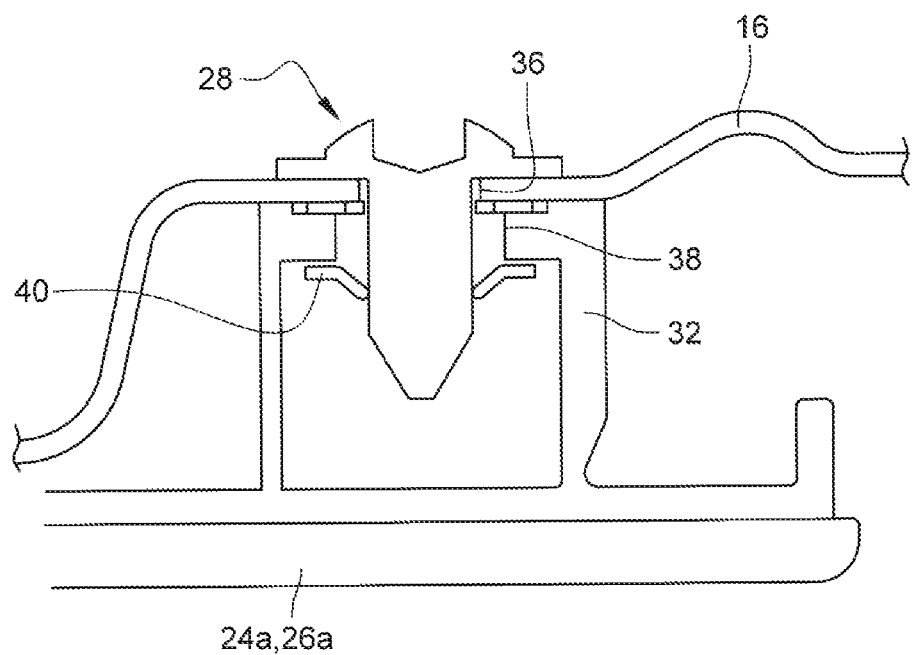

KIT AND METHOD FOR CLADDING A DOOR RAIL OF A VEHICLE

TECHNICAL FIELD

Embodiments of the disclosure relate to a kit and a method for cladding a door rail of a vehicle.

BACKGROUND

A motor vehicle comprises doors, each of which usually comprises at least one window. As shown in FIG. 1, a door 10 comprises of a lower part 10a and an upper part 10b which forms a frame 12 intended to surround the window 14. When this window 14 is movable, it can be moved from the upper part 10b to the lower part 10a. The frame 12 has a general inverted U-shape and comprises two side rails 12a connected by a cross rail 12b. The side rails 12a are generally called posts because of their substantially vertical orientation.

The upper 10b and lower 10a parts of the door can be made up of a single piece, as shown schematically in FIG. 1, or of two or more pieces fixed together, as shown in FIG. 2. This disclosure applies to this type of door with an upper part and therefore with a frame and does not apply to doors without a frame.

The door is generally manufactured from one or more sheets that can be stamped, welded, riveted, etc. The door is more and more cladded to improve its aesthetics. This is particularly the case for one of its middle bottom posts to which a finishing member such as a trim can be attached and fixed.

For this purpose, there is a cladding assembly comprising a sealing joint intended to cooperate with the door window along the post, and a trim intended to improve the aesthetics of the door along the post.

In current technology, a car manufacturer asks a supplier to provide a cladding assembly according to a desired aesthetic aspect and for a well-defined door reference. Depending on the specificities of this door and in particular its post, the supplier will therefore design a particular assembly adapted to it.

Among the aesthetic aspects that can be desired by a manufacturer is the "flush" aspect, which consists in aligning an outer surface of the trim with an outer surface of the window of the door. This "smooth" aspect is currently particularly appreciated by customers. In contrast to this "flush" aspect, there is a more classic aesthetic aspect that can be called "non flush", which consists in having a gap between the above-mentioned outer surfaces.

In the current technique, it is therefore understood that a supplier will have to design a cladding assembly for a given aesthetic aspect and for a particular door reference.

SUMMARY

This disclosure proposes an improvement to this situation. To this end, the disclosure proposes a kit for cladding a door rail of a vehicle, comprising a first cladding assembly comprising a first sealing member intended to cooperate with a window of the door along the rail, and a first finishing member intended to improve the aesthetics of the door along the rail, the first assembly comprising first elements for attachment to the rail, wherein it comprises a second cladding assembly comprising a second sealing member intended to cooperate with a window of the door along the rail, and a second finishing member intended to improve the aesthetics of the door along the rail, the second assembly comprising second elements for attachment on the rail, the first and second assemblies being both suitable for mounting on the rail of the same door, and only one of these assemblies being mounted on this rail according to a desired aesthetic aspect among a first aspect called "flush" and a second aspect called "non-flush", the first assembly being mounted on the rail if the first "flush" aspect is desired, this first assembly being configured so that the finishing member has an outer surface aligned with an outer surface of the window of the door, when the first assembly is fixed on the rail of this door, and the second assembly being mounted on the rail if the second "non-flush" aspect is desired, this second assembly being different from the first assembly and configured so that the finishing member has an outer surface spaced from an outer surface of the window of the door, when the second assembly is fixed on the rail of this door.

It is therefore proposed a kit comprising two cladding assemblies designed to clad the same door reference or model and in particular the same door rail. Naturally, only one of the assemblies will be used by the car manufacturer, but he will have the choice to use one or the other depending on the aesthetic aspect desired and for example on the car's range. For a standard range, a "non-flush" aspect could be used while for a luxury range, a "flush" aspect could be used.

The kit, according to the disclosure, may comprise one or more of the following characteristics, taken in isolation from each other or in combination with each other:

the sealing member and the finishing member of each assembly are formed by two separate pieces, the finishing member being configured to cooperate with the fixing elements and to hold the sealing member of the same assembly;

the sealing member of each assembly is a sliding joint and has an elongated portion having a U-shaped section in which the window or a guide element carried by the window is intended to be accommodated and slid;

the finishing member is configured to hold the sealing member of the same assembly tight against a portion of the rail;

the finishing member of each assembly is a trim;

the finishing member of each assembly comprises studs of support on the rail;

the finishing member of each assembly comprises tabs for hanging on the rail;

the finishing member of each assembly is made up of one or more elements and materials (example: single material injected monobloc piece, or bi-injected monobloc piece, or part made up of an add-on aspect piece (glued or adhered or snapped, etc.) on a second fixing part, the aspect part can be adapted (colour, texture, gloss) according to the desired effect;

the finishing member of each assembly comprises a wall intended to extend along the rail and covering the rail, the first finishing member being configured, when fixed to the rail, to have its wall located at a distance d1 from the rail, and the second finishing member being configured, when fixed to the rail, to have its wall located at a distance d2 from the rail that is greater than d1;

the fixing elements of each assembly comprise screws or pins or rivets configured to pass through holes in the rail and to be engaged in holes in the finishing member.

This disclosure also concerns a method of cladding a door rail of a vehicle with a kit according to one of the preceding claims, comprising the steps of:

choosing an aesthetic aspect from the "flush" and "non-flush" aspect, and fixing the assembly corresponding to the chosen aesthetic aspect to the door rail.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 is a schematic view of a door of a vehicle, the upper and lower parts of which are formed in one piece;

FIG. 2 is a schematic view of another door of a vehicle, the upper and lower parts of which are made up of different pieces that are assembled;

FIG. 3 is a schematic cross-sectional view of a cladding assembly of an upper door rail of a vehicle;

FIG. 4 is a schematic cross-sectional view of a cladding assembly of a side door rail of a vehicle;

FIG. 5 is a schematic cross-sectional view of a cladding assembly of an upper door rail of a vehicle;

FIG. 6 is a schematic cross-sectional view of a cladding assembly of middle bottom side rails of a vehicle;

FIG. 7 is a schematic cross-sectional view of one of the cladding assemblies according to a first embodiment of a kit according to the disclosure;

FIG. 8 is a schematic cross-sectional view of another of the cladding assemblies according to a first embodiment of a kit according to the disclosure;

FIG. 9 is a schematic cross-sectional view similar to those in FIGS. 7 and 8 and showing the two overlapping cladding assemblies of the first embodiment of the kit to assess the differences in position between their sealing and finishing members;

FIG. 10 is a schematic cross-sectional view of one of the cladding assemblies according to a second embodiment of a kit according to the disclosure;

FIG. 11 is a schematic cross-sectional view of another of the cladding assemblies according to a second embodiment of a kit according to the disclosure;

FIG. 12 is a schematic cross-sectional view of one of the cladding assemblies according to a third embodiment of a kit according to the disclosure;

FIG. 13 is a schematic cross-sectional view of another of the cladding assemblies according to a third embodiment of a kit according to the disclosure;

FIG. 14 is a schematic perspective view of a finishing member, and FIG. 14a is a larger scale view of a detail of FIG. 14;

FIG. 15 is a schematic perspective exploded schematic view of elements of an upper door part of a vehicle door;

FIG. 16 is a schematic cross-sectional view of one of the cladding assemblies according to a variant of embodiment; and FIG. 17 is a schematic cross-sectional and larger-scale view of one of the cladding assemblies in another variant.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

FIGS. 3 to 6 illustrate different motor vehicle rails 16. This shows that the rails 16 of vehicles can be very different in shape, size and composition. They may comprise one or more skin(s) or sheet(s) 16a, 16b, 16c which are shaped by pressing, bending, rolling, for example. The skins or sheets 16a, 16b, 16c are assembled one on top of the other, for example by welding, riveting, screwing, etc.

FIG. 3 represents a cross-sectional view of an upper rail 12b and FIG. 4 represents a cross-sectional view of a side rail 12a. FIG. 5 represents a cross-sectional view of an upper rail 12b and FIG. 6 represents a cross-sectional view of middle bottom side rails 12a.

In the following description, the rails, which are upper or lateral, will be referred to by the same reference 16.

The rails 16 are cladded with assemblies 18 comprising at least one sealing member 22 and one finishing member 20. The members 20, 22 can be made up of a single piece (FIGS. 3, 4 and 6) or two separate pieces (FIG. 5).

The members 20, 22 extend along and on the rail 16 and are designed to hide it while sealing with the window 14, the rail 16 or another element of the vehicle body.

The cladding assemblies shown in FIGS. 3 to 6 are of the "non-flush" type, i.e. their finishing members 20 comprise an outer surface 20a visible to a user outside the vehicle, which is not aligned with the outer surface 14a of the window 14.

FIGS. 7 to 9 illustrate the principle of the disclosure, which consists in proposing, in the form of a kit, two cladding assemblies 24, 26 intended to provide different aesthetic aspects, respectively "flush" and "non-flush", and suitable for mounting on the same door reference and therefore the rail 16.

Each cladding assembly 24, 26 comprises a sealing member 24b, 26b intended to cooperate with a window 14 of the door along the rail 16, and a finishing member 24a, 26a intended to improve the aesthetics of the door along the rail. Each assembly 24, 26 also comprise elements 28 for attachment on the rail 16.

The assemblies 24, 26 are both suitable for mounting on the rail 16. Only one of these assemblies is mounted according to the aesthetic aspect sought among "flush" and "non flush".

The cladding assembly 24 in FIG. 7 is intended to provide the desired "non-flush" aspect. The finishing member 24a, which is in the form of a trim, is configured to have an outer surface 30a which is spaced from the outer surface 14a of the window 14 when the assembly 24 is fixed on the rail 16.

In the example shown, the member 24a comprises a substantially flat wall 30 intended to extend along the rail 16 and to cover it at least partially. The outer surface 30a is supported by this wall 30 which comprise an inner surface 30b facing the rail and on which are formed projecting studs 32 of support on the rail.

Support and/or hanging tabs can also extend from the wall 30 to the rail 16 and cooperate with this rail to ensure the positioning and holding of the member 24a on the rail 16.

The fixing elements 28 are formed here by screws or pins that are configured to pass through holes 36 provided on the rail and to be engaged, for example by screwing, in holes 38 of the finishing member such as holes formed in support studs 32.

In the example shown, the member 24a comprises a longitudinal edge on which a hanging tab 34 is located, and an opposite longitudinal edge that extends at a distance from a portion of the rail to define with it a longitudinal groove 38 for receiving the sealing member 24b.

A member 24a is best visible in FIGS. 14 and 14a.

In the example shown, this sealing member 24b is a sliding joint that has an elongated portion with a U-shaped section in which the window 14 is to be accommodated and slid.

FIG. 15 shows some pieces of the upper part of a door, in particular a sliding joint J, which is a sealing member well known to a skilled person specializing in motor vehicle sealing.

In the mounted position shown in FIG. 7, the wall 30 is located at a distance d2 from the rail 16. The window 14 is engaged in the sealing member 24b accommodated in the groove 38 and the surfaces 30a, 14a are spaced from each other.

The cladding assembly 26 in FIG. 8 is intended to provide the desired "flush" aspect. The finishing member 26a, which is here in the form of a trim, is configured to have an outer surface 30a which is aligned with the outer surface 14a of the window 14 when the assembly 26 is fixed on the rail 16.

In the example shown, the member 26a comprises a substantially flat wall 30 intended to extend along the rail 16 and to cover it at least partially. The outer surface 30a is supported by this wall 30 which comprises an inner surface 30b facing the rail and on which are formed projecting studs 32 of support on the rail.

Support and/or hanging tabs 24 can also extend from the wall 30 to the rail 16 and cooperate with this rail to ensure the positioning and holding of the member 24a on the rail 16.

The fixing elements 28 are formed here by screws or pins that are configured to pass through holes 36 provided on the rail and to be engaged, for example by screwing, in holes 38 of the finishing member such as holes formed in support studs 32.

In the example shown, the member 26a comprises a longitudinal edge on which is located a hanging tab 34, and an opposite longitudinal edge that extends at a distance from a portion of the rail to define with it a longitudinal groove 38 for receiving the sealing member 26b.

A member 24a is best visible in FIGS. 14 and 14a.

In the example shown, this sealing member 26b is a sliding joint that has an elongated portion with a U-shaped section in which a guide 40 carried by the window 14 is to be accommodated and slid.

FIG. 15 shows the composition of the upper part of a door and in particular a sliding joint J, which is a sealing member well known to a skilled person specialized in motor vehicle sealing.

In the mounted position shown in FIG. 8, the wall 30 is located at a distance d1 from the rail 16, this distance d1 being smaller than the above-mentioned distance d2. The window 14 is aligned with the wall 30 and their surfaces 30a, 14a are aligned.

FIG. 9 shows the difference in the positioning of assemblies 24, 26 and in particular their members 24a, 24b, 26a, 26b due to the difference between the distances d1, d2 in particular.

FIGS. 10 and 11 on the one hand, and 12 and 13 on the other hand, show variant embodiments of the kit according on the disclosure.

FIG. 10 illustrates a cladding assembly 26 intended to provide a "flush" aspect and FIG. 11 illustrates a cladding assembly 24 intended to provide a "non-flush" aspect for the same cladding kit.

FIG. 12 illustrates a cladding assembly 26 intended to provide a "flush" aspect and FIG. 13 illustrates a cladding assembly 24 intended to provide a "non-flush" aspect for the same cladding kit.

The fixing elements 28 in FIGS. 10 to 13 are formed here by screws or pins which are configured to pass through holes 36 of a tab 34 of the finishing member 24a, 26a and to be engaged, for example by screwing, in holes 38 of the rail 16. These screws or pins comprise heads that are intended to be hidden by the sealing member 24b, 26b. The latter must therefore be removed to gain access to the fixing elements 28.

FIGS. 16 and 17 are similar views to those in FIGS. 7 to 13 and show other variant embodiments of the disclosure.

These FIGURES show, for example, that the finishing member 24a, 26a can be formed from two different materials. The sealing member 24b, 26b is not shown in FIGS. 16 and 17.

In addition, FIG. 17 shows an example of a fixing element 28 that passes through an orifice 36 and a hole 38 and is retained in this hole by at least one spring lock or force insertion washer 40 located in the hole 38.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase In general, "at least one of A and B" is equivalent to "A and/or B" or vice versa, namely "A" alone, "B" alone or "A and B." Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A kit for cladding a door rail of a vehicle, comprising:
   a first cladding assembly comprising a first sealing member intended to cooperate with a window of a specific door along said rail, and a first finishing member intended to provide a first aesthetic aspect of said specific door along said rail, the first cladding assembly being suitable for mounting on the rail of said specific door and comprising first elements for attachment to said rail;

said first aesthetic aspect being a flush aspect according to which said first cladding assembly is configured so that said first finishing member has a first outer surface which is aligned with an outer surface of the window of said specific door, when the first cladding assembly is fixed on the rail of said specific door;

wherein said kit further comprises a second sealing member intended to cooperate with said window of said specific door along said rail, and a second finishing member intended to provide a second aesthetic aspect of said specific door along said rail, said second cladding assembly being suitable for mounting on the rail of said specific door in the place of said first cladding assembly, and said second cladding assembly comprising second elements for attachment on said rail;

said second aesthetic aspect being a non-flush aspect according to which said second cladding assembly is configured so that said second finishing member has a second outer surface spaced from said outer surface of the window of said specific door, when the second cladding assembly is fixed on the rail of said specific door;

and wherein only one of said first and second cladding assemblies is mounted on said rail according to a desired aesthetic aspect among said first aesthetic aspect and said second aesthetic aspect.

2. The kit according to claim 1, wherein the first sealing member and the first finishing member of said first cladding assembly are formed by two separate pieces, the first finishing member being configured to cooperate with said first elements and to hold the first sealing member of said first cladding assembly, and wherein the second sealing member and the second finishing member of said second cladding assembly are formed by two separate pieces, the second finishing member being configured to cooperate with said second elements and to hold the second sealing member of said second cladding assembly.

3. The kit according to claim 2, wherein the first sealing member of said first sealing assembly is a sliding joint and has an elongated portion having a U-shaped section in which said window or a guide element carried by said window is intended to be accommodated and slid, and wherein the second sealing member of said second sealing assembly is a sliding joint and has an elongated portion having a U-shaped section in which said window or a guide element carried by said window is intended to be accommodated and slid.

4. The kit according to claim 3, wherein said first finishing member is configured to hold said first sealing member of said first cladding assembly against a portion of said rail, and wherein said second finishing member is configured to hold said second sealing member of said second cladding assembly against a portion of said rail.

5. The kit according to claim 1, wherein said first finishing member of said first cladding assembly is a trim, and wherein said second finishing member of said second cladding assembly is a trim.

6. The kit according to claim 1, wherein said first finishing member of said first cladding assembly comprises studs of support on said rail, and wherein said second finishing member of said second cladding assembly comprises studs of support on said rail.

7. The kit according to claim 1, wherein said first finishing member of said first cladding assembly comprises tabs for hanging on said rail, and wherein said second finishing member of said second cladding assembly comprises tabs for hanging on said rail.

8. The kit according to claim 1, wherein said first finishing member of said first cladding assembly comprises a first wall intended to extend along said rail and to cover said rail;

wherein said second finishing member of said second cladding assembly comprises a second wall intended to extend along said rail and to cover said rail;

wherein said first finishing member is configured, when fixed to the rail, to have said first wall located at a distance $d1$ from the rail; and wherein said second finishing member is configured, when fixed to the rail, to have said second wall located at a distance $d2$ from the rail, said distance $d2$ being greater than said distance $d1$.

9. The kit according to claim 1, wherein said first elements of said first cladding assembly comprise screws or pins configured to pass through holes in said rail and to be engaged in holes in said first finishing member, and wherein said second elements of said second cladding assembly comprise screws or pins configured to pass through holes in said rail and to be engaged in holes in said second finishing member.

10. A method of cladding a door rail of a vehicle with a kit according to claim 1, said method comprising:

choosing a desired aesthetic aspect among first and second aesthetic aspects, and fixing said first cladding assembly on the door rail when said first aesthetic aspect is desired, or fixing said second cladding assembly on the door rail when said second aesthetic aspect is desired.

* * * * *